UNITED STATES PATENT OFFICE.

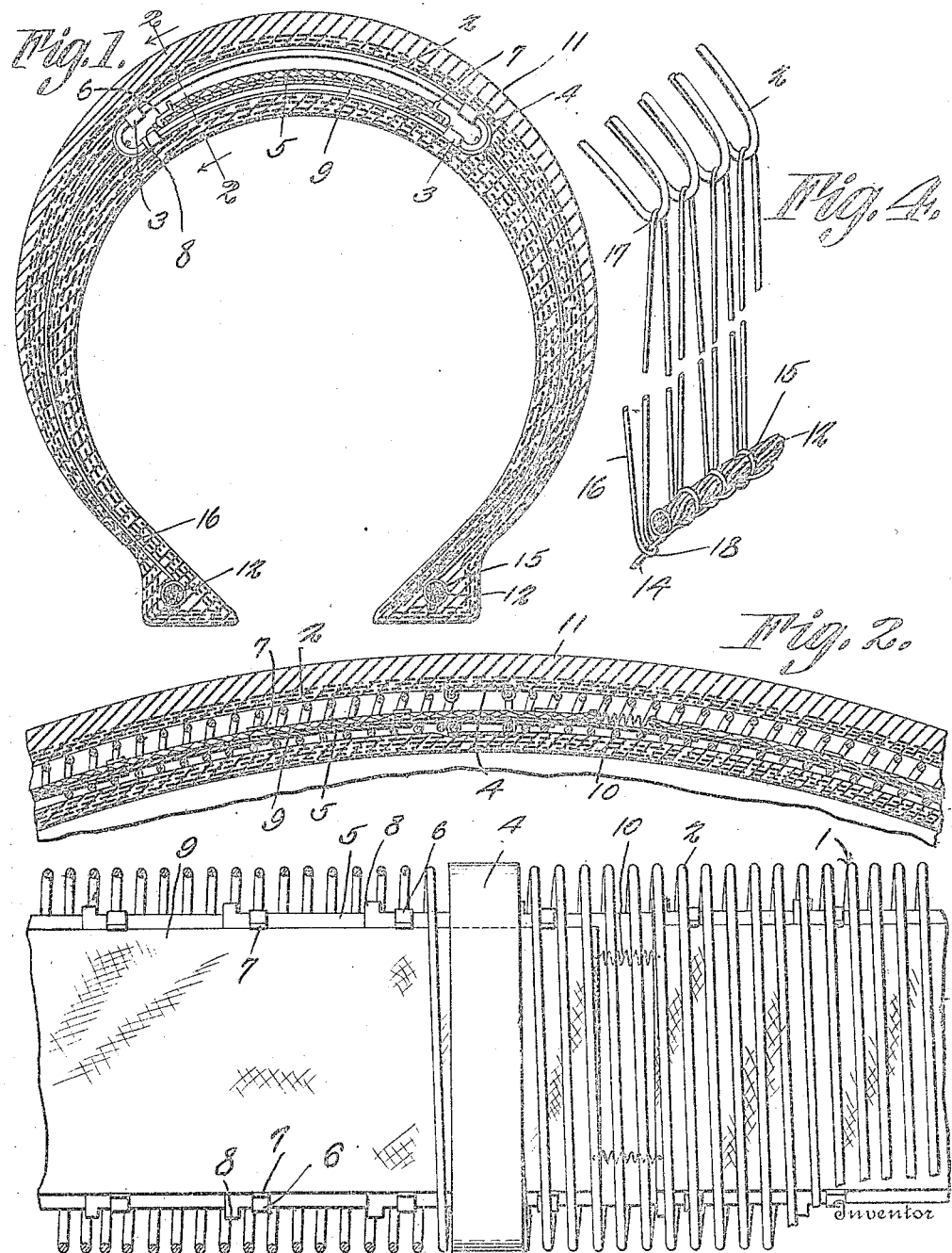

JOHN F. BEESELMAN, OF EAST CHICAGO, INDIANA.

AUTOMOBILE-TIRE.

1,301,998.

Specification of Letters Patent.

Patented Apr. 29, 1919.

Application filed January 23, 1919. Serial No. 272,729.

*To all whom it may concern:*

Be it known that I, JOHN F. BEESELMAN, a citizen of the United States, residing at East Chicago, in the county of Lake and State of Indiana, have invented a new and useful Automobile-Tire, of which the following is a specification.

It is the object of this invention to provide novel means for reinforcing a tire casing against puncture, and for giving the casing increased resiliency. Another object of the invention is to provide means for reinforcing the casing against blow-outs.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in cross section, a tire casing embodying the invention; Fig. 2 is a fragmental longitudinal section on the line 2—2 of Fig. 1; Fig. 3 is a top plan of the reinforcing structure for the casing, parts being broken away; and Fig. 4 is a perspective view showing means for connecting the reinforcing structure with the side members.

The numeral 1 denotes a helical spring having flattened convolutions 2. The terminal convolutions of the spring 1 are mounted in eyes 3 on the edges of a loop-shaped link 4 extended transversely of the structure. Disposed within the spring 1 and coacting with the inner portions of the convolutions thereof is a metallic protector, preferably made of plates 5, formed of steel or other suitable material and having, if desired, some resiliency. The ends of the plates 5 are overlapped circumferentially of the structure, and the protector is circumferentially yieldable. The ends of the plates 5 are slidably connected, and, with this end in view, each plate has, adjacent one end, arms 6, overhanging an adjoining plate and supplied with fingers 7 which project outwardly, as indicated in Fig. 1. Each plate is provided, adjacent its other end, with arms 8, extending beneath an adjoining plate, and, thus, the plates are slidably connected for relative movement circumferentially of the device. The protector above described is inclosed within and engaged by a belt 9 which is yieldable, and resilient if desired. The belt 9 may be made of leather, rubber or any other suitable material having the necessary characteristics. The ends of the belt 9 are connected by retractile springs 10.

The reinforcement above set forth is mounted in the tread portion of a tire casing 11. In the beads of the tire casing 11, side members 12 are located. The side members 12 may be wire cables if desired. Flexible elements 14 extend longitudinally of the cables 12 and are connected therewith by half hitches 15. A sinuous tie 16 is supplied, the same being in the form of a wire or cord. The tie is fashioned into oppositely extended loops, projecting inwardly and outwardly, the outwardly projecting loops being threaded through the ends of the convolutions of the spring 1, as shown at 17 and the inwardly projecting loops being passed around the flexible tie 16, between the half hitches 15, as shown at 18.

The spring 10 adds resiliency to the tire casing, and the protector comprising the plates 5, prevents punctures. The plates 5 can slide with respect to each other, circumferentially of the casing, and, thus, the resiliency of the casing will not be interfered with by the presence of the protector. The plates 5 of the protector are held in place by the circumscribing belt 9, and it is to be observed that the belt is located between the fingers 7, the belt thus being held in place on the protector. The tie 16 aids in reinforcing the casing and in holding spring 1 in place.

Having thus described the invention, what is claimed is:—

1. In a device of the class described, a casing; a helical spring therein; a protector coöperating with the inner portions of the convolutions of the spring and comprising plates having their ends overlapped circumferentially of the casing; means for connecting the plates slidably; and a flexible band surrounding the plates.

2. In a device of the class described, a casing; a helical spring therein; a metallic anti-puncturing protector coöperating with the inner portions of the convolutions of the spring, and of yieldable construction; side members in the casing; and means for connecting the side members with the ends of the convolutions of the spring.

In testimony that I claim the foregoing as my own, I have hereto affixed my signature in the presence of two witnesses.

JOHN F. BEESELMAN.

Witnesses:
GEORGE A. MOCK,
LEO H. WOLFF.